United States Patent
Hung et al.

(10) Patent No.: US 8,664,330 B2
(45) Date of Patent: *Mar. 4, 2014

(54) REACTIVE HOT MELT ADHESIVE WITH IMPROVED HYDROLYSIS RESISTANCE

(75) Inventors: Ju-Ming Hung, Yardley, PA (US); Wayne K. Chu, Basking Ridge, NJ (US); Yue S. Zhang, Somerset, NJ (US); Ingrid Cole, Flemington, NJ (US)

(73) Assignee: Henkel US IP LLC, Rocky Hill, CT (US)

( * ) Notice: Subject to any disclaimer, the term of this patent is extended or adjusted under 35 U.S.C. 154(b) by 1651 days.

This patent is subject to a terminal disclaimer.

(21) Appl. No.: 10/408,141

(22) Filed: Apr. 4, 2003

(65) Prior Publication Data

US 2004/0198899 A1    Oct. 7, 2004

(51) Int. Cl.
- *B32B 27/00* (2006.01)
- *B32B 27/40* (2006.01)
- *C08F 8/30* (2006.01)
- *C08F 283/04* (2006.01)
- *C08G 18/00* (2006.01)
- *C08G 18/08* (2006.01)
- *C08G 18/28* (2006.01)
- *C08J 3/00* (2006.01)
- *C08K 3/20* (2006.01)
- *C08L 75/00* (2006.01)
- *C09J 4/00* (2006.01)
- *C09J 101/00* (2006.01)
- *C09J 201/00* (2006.01)

(52) U.S. Cl.
USPC ............ 524/590; 156/331.4; 428/423.1; 524/507; 524/589; 525/123; 525/455; 528/44; 528/85

(58) Field of Classification Search
USPC ............ 524/507, 589, 590; 525/123, 455; 528/44, 85; 428/423.1; 156/331.4
See application file for complete search history.

(56) References Cited

U.S. PATENT DOCUMENTS

| | | |
|---|---|---|
| 4,585,819 A | 4/1986 | Reischle et al. |
| 4,775,719 A | 10/1988 | Markevka et al. |
| 5,036,143 A | 7/1991 | Brauer et al. |
| 5,166,289 A | 11/1992 | Yezrielev et al. |
| 5,342,873 A | 8/1994 | Merz et al. |
| 5,506,296 A | 4/1996 | Chenard et al. |
| 5,618,904 A | 4/1997 | Martin et al. |
| 5,965,662 A | 10/1999 | Krebs et al. |
| 5,994,493 A | 11/1999 | Krebs |
| 6,387,449 B1 | 5/2002 | Reid et al. |
| 6,399,735 B1 | 6/2002 | Fischer et al. |
| 6,613,836 B2 | 9/2003 | Rumack |
| 2002/0013406 A1 | 1/2002 | Li et al. |
| 2003/0022973 A1 | 1/2003 | Hung et al. |
| 2004/0198899 A1 | 10/2004 | Hung et al. |

FOREIGN PATENT DOCUMENTS

| | | |
|---|---|---|
| DE | 19742217 | 4/1999 |
| EP | 0838511 | 4/1998 |
| JP | 06271832 | 9/1994 |
| WO | WO 94/13726 | * 6/1994 |
| WO | WO 99/28363 | 10/1999 |
| WO | WO 01/81495 | 1/2001 |
| WO | WO 2004/035647 | 4/2004 |
| WO | WO 2004/035706 | 4/2004 |
| WO | WO 2004/094552 | 11/2004 |

* cited by examiner

*Primary Examiner* — Patrick Niland
(74) *Attorney, Agent, or Firm* — James E. Piotrowski; Steven C. Bauman

(57) ABSTRACT

High green strength reactive hot melt adhesives are prepared using relatively low levels of reactive acrylic, and may be prepared with liquid crystalline or crystalline diols.

10 Claims, No Drawings

REACTIVE HOT MELT ADHESIVE WITH IMPROVED HYDROLYSIS RESISTANCE

FIELD OF THE INVENTION

The invention relates to hot melt adhesives, in particular reactive hot melt adhesives having improved green strength.

BACKGROUND OF THE INVENTION

Hot melt adhesives are solid at room temperature but, upon application of heat, melt to a liquid or fluid state in which form they are applied to a substrate. On cooling, the adhesive regains its solid form. The hard phase(s) formed upon cooling the adhesive imparts all of the cohesion (strength, toughness, creep and heat resistance) to the final adhesive. Curable hot melt adhesives, which are also applied in molten form, cool to solidify and subsequently cure by a chemical crosslinking reaction. An advantage of hot melt curable adhesives over traditional liquid curing adhesives is (1) their ability to provide "green strength" upon cooling prior to cure and (2) provide adhesives of very low crosslinking density and thus high levels of flexibility and toughness.

The majority of reactive hot melts are moisture-curing urethane adhesives. These adhesives consist primarily of isocyanate terminated polyurethane prepolymers that react with surface or ambient moisture in order to chain-extend, forming a new polyurethane polymer. Polyurethane prepolymers are conventionally obtained by reacting diols with diisocyanates. Pure diols are favored for use, instead of polyols with higher functionality, to avoid excessive branching that can lead to poor pot stability. Methylene bisphenyl diisocyanate (MDI) is favored over lower molecular weight isocyanates to minimize volatility. Cure is obtained through the diffusion of moisture from the atmosphere or the substrates into the adhesive, and subsequent reaction. The reaction of moisture with residual isocyanate forms carbamic acid. This acid is unstable, decomposing into an amine and carbon dioxide. The amine reacts rapidly with isocyanate to form a urea. The final adhesive product is a lightly crosslinked material held together primarily through hydrogen bonding, urea groups and urethane groups.

The prior art discloses that that the performance of reactive hot melt adhesives for most applications may be substantially improved by the incorporation of acrylic polymers into conventional polyurethane adhesives, in particular reactive hydroxy-containing and non-reactive acrylic copolymers. Improvement in green strength may be obtained by adding higher molecular weight polymers (reactive or not) and/or incorporating crystalline diols, most commonly polyester diols.

These prior art adhesives are extremely tough, with outstanding low temperature flexibility, heat and chemical resistance, and specific adhesion to polar substrates. Adhesion to a wide range of other substrates may be obtained through the addition of adhesion promoters such as silane coupling agents. Despite these advances in the art, there remains a need for improvements in reactive hot melt technology to expand the application of such adhesives and their effectiveness in such applications. The present invention addresses this need.

SUMMARY OF THE INVENTION

The invention provides moisture curable reactive hot melt adhesive compositions that have improved green strength and hydrolysis resistance.

One aspect of the invention is directed to a polyurethane hot melt adhesive composition comprising an isocyanate, an effective amount of a non-polymeric aromatic diol and/or an effective amount of a non-polymeric aliphatic diol and optionally, a polyether diol and/or plastic. The non-polymeric aromatic diol may be either a liquid crystalline diol or a crystalline diol.

Another embodiment of the invention is directed to a method of improving the green strength of a polyurethane hot melt adhesive comprising adding an effective amount of a non-polymeric aromatic diol and/or an aliphatic diol to a reactive hot melt adhesive formulation.

Yet another embodiment of the invention is directed to a method for bonding materials together which comprises applying the reactive hot melt adhesive composition of the invention in a liquid form to a first substrate, bringing a second substrate in contact with the composition applied to the first substrate, and subjecting the applied composition to conditions which will allow the composition to cool and cure to an irreversible solid form, said conditions comprising moisture.

Still another aspect of the invention is directed to an article of manufacture comprising the adhesive of the invention.

DETAILED DESCRIPTION OF THE INVENTION

The disclosures of all documents cited herein are incorporated in their entiries by reference.

All percents are percent by weight of the adhesive composition, unless otherwise stated.

It has now been discovered that high green strength reactive hot melt adhesives may be prepared using non-polymeric aromatic diols, including liquid crystalline and/or crystalline diols, and/or non-polymeric aliphatic diols. The adhesives may also incorporate a polyether diol, but do not include a polyester diol. The adhesives of the invention have improved green strength and have improved resistance to hydrolysis under neutral, alkaline and acidic conditions. The reactive hot melt adhesive of the invention provides improved hydrolysis resistance to any water-containing material or environment.

The moisture curable, hot melt polyurethane adhesives of the invention may be prepared through the reaction of a mixture of non-polymeric aromatic diols and/or aliphatic diols with an isocyanate-containing compound at a temperature of from about 250° F. to about 275° F. The adhesives of the invention comprise an isocyanate, MDI being preferred, from about 0.1 wt % to about 40 wt % of a non-polymeric aromatic diol, from about 0.1 wt % to about 40 wt % of a non-polymeric aliphatic diol. The aliphatic and aromatic diols will preferably have a molecular weight of 2,000 or less.

Non-polymeric aromatic diols that may be used to practice the invention include, but are not limited to, liquid crystalline diols such as the main chain mesogen Brilliant Yellow and the side chain diol mesogen Dispersed Red. Crystalline diols that may be utilized to practice the invention include 1,5-Dihydroxynaphthalene (DHN), 2',4'-Dihydroxybenzophenone (DHBP) and 4,4'-(Hexanfluroisopropylidene)diphenol (HFIPDP). Additional crystalline diols that may be utilized include aminobenzyl alcohol; aminobenzylamine; aminophenol, Bis(2-hydroxyethyl)terephthalate; 1,5-Diaminonaphthalene, 4-hydroxyphenethyl alcohol; 2-hydroxy-4-methoxybenzyl alcohol; hydroxybenzyl alcohol, 2-(2-Hydroxyethoxy)phenol, 3-(1-hydroxyethyl)aniline, 4-hydroxy-3-methoxybenzyl alcohol, Homovanillyl alcohol, 4-hydroxyphenethyl alcohol, hydroquinone di(beta-hydroxyethyl) ether, 2,6-Dihydroxyanthraquinone; 1,5-Dihydroxynaphthalene (DHN); Diethylstilbestrol; 9H-Fluorene- 9,9-dimethanol; Eosin B, spirit soluble; 5-tertbutyl-1,3-benzenedicarboxilic acid; 5-tert-Butyl-4-hydroxy-2-methylphenyl sulfide; 3-(4-Carboxylphenyl) 2,3-dihydro-1,1,3-trimethyl indene-5-carboxylic acid; 4,4'-di (aminophenyl)-9-fluorenylidene; 2',4'-Dihydroxyacetophenone, tetramethyl benzene dimethanol and mixtures thereof.

Aliphatic olefin diols that may be used to practice the invention include dodecane diol, cyclohexane diol, decane diol, octane diol, and hexane diol. Additional aliphatic olefin diols that may be utilized include cyclododecane diol.

The reactive hot melt compositions of the invention are useful for bonding articles composed of a wide variety of substrates (materials), including but not limited to wood, metal glass and textiles. The adhesives of the invention are resistant to hydrolysis under alkaline or acid conditions, and are resistant to reactions of hydroxy- and carboxy-containing products, such as fatty acids, tall oil, ethylene glycol and propylene glycol. As such, these adhesive find particular use in applications such as use in water towers, for bonding to exterior surfaces, bonding to wood with high levels of pitch and e.g., in marine and automotive applications. Other non-limiting uses include textile bonding applications (carpet and clothing), use in the manufacture of footwear (shoes), use as a glazing/backbedding compound in the manufacture of windows, use in the manufacture of doors including entry doors, garage doors and the like, use in the manufacture of architectural panels, use in bonding components on the exterior of vehicles, and the like.

The urethane prepolymers that can be used to prepare the adhesives of the invention are those conventionally used in the production of polyurethane hot melt adhesive compositions. Any suitable compound, which contains two or more isocyanate groups, may be used for preparing the urethane prepolymers. Organic polyisocyanates, which may be used to practice the invention, include alkylene diisocyanates, cycloalkylene diisocyanates, aromatic diisocyanates and aliphatic-aromatic diisocyanates. Specific examples of suitable isocyanate-containing compounds include, but are not limited to, ethylene diisocyanate, ethylidene diisocyanate, propylene diisocyanate, butylene diisocyanate, trimethylene diisocyanate, hexamethylene diisocyanate, toluene diisocyanate, cyclopentylene-1,3-diisocyanate, cyclo-hexylene-1,4-diisocyanate, cyclohexylene-1,2-diisocyanate, 4,4'-diphenylmethane diisocyanate, 2,2-diphenylpropane-4,4'-diisocyanate, xylylene diisocyanate, 1,4-naphthylene diisocyanate, 1,5-naphthylene diisocyanate, m-phenylene diisocyanate, p-phenylene diisocyanate, diphenyl-4,4'-diisocyanate, azobenzene-4,4'-diisocyanate, diphenylsulphone-4,4'-diisocyanate, 2,4-tolylene diisocyanate, dichlorohexa-methylene diisocyanate, furfurylidene diisocyanate, 1-chlorobenzene-2,4-diisocyanate, 4,4',4"-triisocyanatotriphenylmethane, 1,3,5-triisocyanato-benzene, 2,4,6-triisocyanato-toluene, 4,4'-dimethyldiphenyl-methane-2,2',5,5-tetratetraisocyanate, and the like. While such compounds are commercially available, methods for synthesizing such compounds are well known in the art. Preferred isocyanate-containing compounds are methylenebisphenyldiisocyanate (MDI), isophoronediisocyanate (IPDI) and toluene diisocyanate (TDI).

Most commonly, the prepolymer is prepared by the polymerization of a polyisocyanate with a polyol, most preferably the polymerization of a diisocyanate with a diol. The polyols used include polyhydroxy ethers (substituted or unsubstituted polyalkylene ether glycols or polyhydroxy polyalkylene ethers), polyhydroxy polyesters, the ethylene or propylene oxide adducts of polyols and the monosubstituted esters of glycerol, as well as mixtures thereof. The polyol is typically used in an amount of between about 10 to about 70 parts by weight.

Examples of polyether polyols include a linear and/or branched polyether having plural numbers of ether bondings and at least two hydroxyl groups, and contain substantially no functional group other than the hydroxyl groups. Examples of the polyether polyol may include polyoxyalkylene polyol such as polyethylene glycol, polypropylene glycol, polybutylene glycol and the like. Further, a homopolymer and a copolymer of the polyoxyalkylene polyols may also be employed. Particularly preferable copolymers of the polyoxyalkylene polyols may include an adduct at least one compound selected from the group consisting of ethylene glycol, propylene glycol, diethylene glycol, dipropylene glycol, triethylene glycol, 2-ethylhexanediol-1,3,glycerin, 1,2,6-hexane triol, trimethylol propane, trimethylol ethane, tris(hydroxyphenyl)propane, triethanolamine, triisopropanolamine, ethylenediamine and ethanolamine; with at least one compound selected from the group consisting of ethylene oxide, propylene oxide and butylene oxide.

A number of suitable polyols are commercially available. Non-limiting examples include CP4701 (Dow Chemicals), Niax 11-34 (Union Carbide Corp)., Desmophen 3900 (Bayer), Propylan M12 (Lankro Chemicals), Highflex 303 (Daiichi Kogyo Seiyaku K.K.) and Daltocel T 32-75 (ICI). Polymer polyols are also suitable, i.e., graft polyols containing a proportion of a vinyl monomer, polymerized in situ, e.g., Niax 34-28.

In addition, the urethane prepolymers may be prepared by the reaction of a polyisocyanate with a polyamino or a polymercapto-containing compound such as diamino polypropylene glycol or diamino polyethylene glycol or polythioethers such as the condensation products of thiodiglycol either alone or in combination with other glycols such as ethylene glycol, 1,2-propylene glycol or with other polyhydroxy compounds disclosed above. In accordance with one embodiment of the invention, the hydroxyl containing acrylic polymer may function as the polyol component, in which case, no additional polyol need be added to the reaction.

Further, small amounts of low molecular weight dihydroxy, diamino, or amino hydroxy compounds may be used such as saturated and unsaturated glycols, e.g., ethylene glycol or condensates thereof such as diethylene glycol, triethylene glycol, and the like; ethylene diamine, hexamethylene diamine and the like; ethanolamine, propanolamine, N-methyldiethanolamine and the like.

Virtually any ethylenically unsaturated monomer containing a functionality greater than one may be utilized in the compositions of the present invention. Functional monomers include, without limitation acid, hydroxy, amine, isocyanate, and thio functional monomers. Hydroxyl functionality is preferred and is described in detail herein.

Most commonly employed are hydroxyl substituted $C_1$ to $C_{12}$ esters of acrylic and methacrylic acids including, but not limited to hydroxyl substituted methyl acrylate, ethyl acrylate, n-butyl acrylate, 2-ethylhexyl acrylate, isobutyl acrylate, n-propyl or iso-propyl acrylate or the corresponding methacrylates. Mixtures of compatible (meth)acrylate monomers may also be used. Additional monomers that may be used include the hydroxyl substituted vinyl esters (vinyl acetate and vinyl propionate), vinyl ethers, fumarates, maleates, styrene, acrylonitrile, etc. as well as comonomers thereof.

These monomers may blended with other copolymerizable comonomers as formulated so as to have a wide range of Tg values, as between about −48° C. and 105° C., preferably 15° C. to 85° C. Suitable comonomers include the $C_1$ to $C_{12}$ esters of acrylic and methacrylic acids including, but not limited to methyl acrylate, ethyl acrylate, n-butyl acrylate, isobutyl acrylate, 2-ethylhexyl acrylate, n-propyl or iso-propyl acrylate or the corresponding methacrylates. Mixtures of compatible (meth)acrylate monomers may also be used. Additional monomers that may be used include the vinyl esters (vinyl acetate and vinyl propionate), vinyl ethers, fumarates, maleates, styrene, acrylonitrile, ethylene, etc. as well as comonomers thereof. The hydroxyl containing monomers may be the same or different from the monomers used in the remainder of the acrylic polymerization. The particular monomers selected will depend, in large part, upon the end use for which the adhesives are intended. Thus, adhesives to be used in pressure sensitive applications or in applications wherein adhesion to metal is required will be selected to obtain a lower Tg polymer than may be desired in non-pressure sensitive applications or those involving more easily bonded substrates.

When the adhesive is to be prepared utilizing monomeric materials, the respective monomers may be added to the polyols and polymerized therein prior to formation of the prepolymer or may be added to the already formed prepolymer and the acrylic polymerization subsequently performed. In the case of polyamino or polymercapto containing prepolymers, in-situ vinylic polymerization must be performed only in the pre-formed prepolymer.

The hydroxyl containing ethylenically unsaturated monomer is polymerized using conventional free radical polymerization procedures to a relatively low molecular weight. For purposes of clarification, use of the term "low molecular weight" means number average molecular weights in the range of approximately 2,000 to 50,000, preferred for use are monomers having an average molecular weight in the range of from about 5,000 to about 30,000. Molecular weight distribution is characterized by Gel Permeation Chromatography using a PL Gel, Mixed 10 micron column, a Shimadzu Model RID 6A Detector with a tetrahydrofuran carrier solvent at a flow rate of 1 milliliter per minute. The low molecular weight is obtained by careful monitoring and controlling the reaction conditions and, generally, by carrying out the reaction in the presence of a chain transfer agent such as dodecyl mercaptan. Subsequent to the polymerization of the ethylenically unsaturated monomer(s), the polyisocyanate and any additional ingredients required for the urethane prepolymer forming reaction are added and that reaction is carried out using conventional condensation polymerization procedures It is also possible to polymerize the low molecular weight polymer in the presence of the already formed isocyanate terminated urethane prepolymer. This method has the drawback of subjecting the prepolymer to unnecessary heating during the acrylic polymerization, heating that might result in branching, viscosity increase, depletion of needed isocyanate groups and possible gellation. Although these disadvantages are subject to control, more stringent control of conditions are required as compared to polymerization in the non-isocyanate functional urethane components. When the reaction is run in the polyol or other non-isocyanate containing component, there is also the advantage of lower reaction viscosities and reduced exposure to isocyanate vapors because of the lesser amount of heating required.

Optionally, the hydroxyl containing functionality may be introduced into the adhesive in the form of pre-polymerized low molecular weight hydroxyl containing polymers. In the latter case, typical polymers include hydroxyl substituted butyl acrylate, hydroxylated butyl acrylate/methyl methacrylate copolymers, hydroxylated ethyl acrylate/methyl methacrylate copolymers, and the like. Preferred polymers have a number average molecular weight of 5,000 to 30,000 and a hydroxyl number of 4 to 30. If used in the form of low molecular weight polymers, the polymers may be blended with the polyol prior to reaction thereof with the isocyanate or they may be added directly to the isocyanate terminated prepolymer.

While the adhesives may be used directly as described above, if desired the adhesives of the present invention may also be formulated with conventional additives which are compatible with the composition. Such additives include plasticizers, compatible tackifiers, curing catalysts, dissociation catalysts, fillers, anti-oxidants, pigments, adhesion promoters, stabilizers, aliphatic $C_5$-$C_{10}$ terpene oligomers, DMDEE, titanium dioxide and the like. Conventional additives that are compatible with a composition according to this invention may simply be determined by combining a potential additive with the composition and determining if they are compatible. An additive is compatible if it is homogenous within the product. Non-limited examples of suitable additives include, without limitation, rosin, rosin derivatives, rosin ester, aliphatic hydrocarbons, aromatic hydrocarbons aromatically modified aliphatic hydrocarbons, terpenes, terpene phenol, modified terpene, high molecular weight hindered phenols and multifunctional phenols such as sulfur and phosphorous-containing phenol, terpene oligomers, DMDEE, paraffin waxes, microcrystalline waxes and hydrogenated castor oil.

The reactive hot melt adhesives of the invention may also contain flame retardant components. Fire retardant additives known in the art for imparting flame resistance to polyurethane compositions may be added. Such compounds include inorganic compounds such as a boron compound, aluminum hydroxide, antimony trioxide and the like, and other halogen compounds including halogen-containing phosphate compounds such as tris(chloroethyl)phosphate, tris(2,3-dichloropropyl)-phosphate, and the like. In a preferred embodiment, ethylenebistetrabromophthalimide and/or tris(2,3-dibromopropyl)-isocyanurate is added as a prime flame retardant component. The ethylenebistetrabromophthalimide and/or tris(2,3-dibromopropyl)isocyanurate may be used with or without other flame retardants. The composition may further comprise a chlorinated paraffin and/or an aryl phosphate ester as a further flame retardant component. The optional chlorinated paraffin imparts flame retardancy as well as performing as a viscosity modifier. The aryl phosphate ester further imparts improved adhesion to the substrates. The flame retardant polyurethane-based reactive hot melt adhesives when used in the practice of the invention gives excellent flame retardancy while maintaining the targeted properties of the base polymer, such as good green strength, controlled setting speed and good thermal stability at elevated temperatures.

The invention also provides a method for bonding articles together which comprises applying the reactive hot melt adhesive composition of the invention in a liquid melt form to a first article, bringing a second article in contact with the composition applied to the first article, and subjecting the applied composition to conditions which will allow the composition to cool and cure to a composition having an irreversible solid form, said conditions comprising moisture. The composition is typically distributed and stored in its solid form, and is stored in the absence of moisture. When the composition is ready for use, the solid is heated and melted prior to application. Thus, this invention includes reactive polyurethane hot melt adhesive compositions in both its solid form, as it is typically to be stored and distributed, and its liquid form, after it has been melted, just prior to its application.

After application, to adhere articles together, the reactive hot melt adhesive composition is subjected to conditions that will allow it to solidify and cure to a composition that has an irreversible solid form. Solidification (setting) occurs when the liquid melt is subjected to room temperature. Curing, i.e. chain extending, to a composition that has an irreversible solid form, takes place in the presence of ambient moisture.

As used herein, "irreversible solid form" means a solid form comprising polyurethane polymers extended from the aforementioned polyurethane prepolymers. The composition having the irreversible solid form typically can withstand temperatures of up to 150° C. Using a flame retardant the thermal stability of the irreversible solid can be improved.

The invention is further illustrated by the following non-limiting examples.

EXAMPLES

In the Examples that follow, the following tests were used to determine viscosity and dynamic peel rate.
Viscosity:
Brookfield Viscometer with Thermosel heating unit, spindle 27
Dynamic Peel:
A 6 mil film of the adhesive was applied to a glass plate, preheated at 120° C. A strip of vinyl (16 mm wide, 7 mil thick) with a hole punched near one end was applied over the adhesive. The plate is inverted and, at several temperature intervals, a 103 g weight was applied to the hole in the vinyl for 10-60 seconds. The peel rate at these intervals was calculated.

Example 1

To determine the tall oil stability of reactive hot melts containing low molecular weight diols and no polyester, four reactive hot melts containing low molecular weight diols were formulated as shown in Table 1. To perform the testing, a 20-mil film of the cured adhesive was put into a glass vial along with 2.0 g of tall oil and 0.5 g of water. The vials were sealed and laid down flat so that the film was in contact with the air sealed inside the vial. The vials were then stored at 150° F. Periodically, a film was removed and tested for integrity by scraping it with a tongue depressor. Failed samples easily break down under the first scrape and show no resilience at all. In extreme failure circumstances, the film would lose all integrity before it was taken out of the vial.

TABLE 1

Tall Oil Stability of Reactive Hot Melt Adhesives Containing Low Molecular Weight Diols

| Material | A | B | C | D |
|---|---|---|---|---|
| PPG 2025 | 14.3 | 15.9 | 18.7 | — |
| PPG 4025 | 28.6 | 31.7 | 27.2 | — |
| Acrylic | 28.6 | 24.7 | 31.2 | 14.9 |
| Dodecanediol | 4.3 | — | — | — |
| Decanediol | — | 5.3 | 3.6 | — |
| Polyester | — | — | — | 68.7 |
| MDI | 16.7 | 21.5 | 16.5 | 12.5 |
| Mondur MR | 6.5 | — | 2.0 | — |
| STABILITY | 20 Days | 15 Days | 12 Days | 3 Days |

PPG 2025 (polypropylene glycol, molecular weight 2000, available from Arch)
PPG 4025 (polypropylene glycol, molecular weight 4000, available from Arch)
MODAFLOW (an acrylic defoamer available from Solutia)
Acrylic, Elvacite 2016, (a 60,000 Mw acrylic - available from Lucite) and Elvacite 2967, (an 18,500 Mw acrylic - available from Lucite)
Polyester, DYNACOLL 7360 (a 3750 MW hexadiol adipate available from Creanova) and Rucoflex S105-10, (a 11220 MW hexadiol adipate available from Bayer)
Mondur MR, a polymeric isocyanate available from Bayer

TABLE 2

Reactive Hot Melt Properties

| | Sample | | | |
|---|---|---|---|---|
| | A | B | C | D |
| % NCO | 3.8 | 1.7 | 2.0 | 1.6 |
| Viscosity (cps) @275F | 14500 | 12030 | 19200 | 17000 |
| Melt Stability % | 3.9 | 2.4 | 0 | 6.7 |
| Peel (set strength) | 8.0 mm/40° C. | 8.0 mm/40° C. | 12.0 mm/40° C. | 0.0 mm/40° C. |

As illustrated in Table 1, the reactive hot melt adhesives that contain a low molecular weight diol and no polyester provide superior stability to the adhesives that contain a polyester. Table 2 indicated that reactive hot melt adhesives with low molecular weight diols performed similar to adhesives with polyesters, in term of green strength.

Example 2

Three reactive hot melt films having a thickness of 10 mils were prepared by using heated drawdown bars and drawing the film onto release paper. The compositions of the films are shown in Table 3.

TABLE 3

Reactive hot melt film compositions.

| | Sample | | |
|---|---|---|---|
| | E | F | G |
| MODAFLOW | 0.8 | | |
| PPG 2025 | 19.5 | | 16.12 |
| PPG 4025 | 19.5 | | 32.23 |
| DYNACOLL 7360 | 19.5 | | |
| DYNACOLL 7380 | — | 1.86 | — |
| ELVACITE 2016 | 28.0 | | 30.08 |
| ELVACITE 2967 | — | 15.19 | |
| Decane Diol | — | | 3.65 |
| RUCO S 105-10 | — | 67.41 | |
| MDI | 12.6 | 11.57 | 16.96 |
| Titanium Dioxide | — | 3.82 | |
| DMDEE | — | | 0.10 |

MODAFLOW (an acrylic defoamer available from Solutia)
DYNACOLL 7360 (a 3750 MW hexaediol adipate available from Creanova)
DYNACOLL 7380 (a 3750 MW hexanediol, dodecanediol adipate copolymer available from DeGussa)
ELVACITE 2967 (an 18,500 Mw acrylic - available from Lucite)
ELVACITE 2016 (a 60,000 Mw acrylic - available from Lucite)
RUCO S 105-10 (a 11220 MW hexaediol adipate available from Bayer)

Specimens of each film having the dimensions 25 mm×70 mm were cut. The cut samples were placed in a vessel containing a 1% sodium hydroxide/deionized water solution at 200° F. The specimens were suspended in the vessel so that they did not come into contact with each other. After heating for the desired period, the specimens were removed from the vessel and rinsed in clean running water for several minutes. After rinsing the specimens were dried and placed in a constant temperature and humidity room having a temperature of 23° C. and a relative humidity of 50% for 24 hours before testing. The specimens were each tested in a tensile testing device by having one inch tape applied to the end of each specimen. The results of the testing are illustrated in Table 4.

TABLE 4

| Test | Sample E | Sample F | Sample G |
| --- | --- | --- | --- |
| Hydrolysis Resistance Study of Reactive Hot Melt Adhesives | | | |
| Modulus (psi) initial | 4759.8 ± 602.1 | 39049.4 ± 1928.5 | 10369.8 ± 307.0 |
| Modulus (psi) 3 Days | 2745.8 ± 246.8 | 23128.8 ± 1740.1 | 8732.1 ± 894.1 |
| Modulus (psi) 7 Days | — | — | 5618.8 ± 643.9 |
| Modulus (psi) 10 Days | — | — | 5684.4 ± 293.9 |
| Strain* (%) initial | 365.4 ± 49.6 | >500 | >500 |
| Strain (%) 3 Days | 57.1 ± 12.8 | 190.6 ± 21.2 | >500 |
| Strain (%) 10 Days | — | — | 310.7 ± 16.7 |
| Stress** (psi) Initial | 375.6 ± 4.9 | 2211.7 ± 111.2 | 945.7 ± 45.2 |
| Stress (psi) 3 Days | 215.0 ± 12.4 | 409.7 ± 68.9 | 848.5 ± 6.3 |
| Stress (psi) 7 Days | — | — | 572.7 ± 12.6 |
| Stress (psi) 10 Days | — | — | 486.0 ± 53.3 |

*Strain was recorded up to 500% elongation
**Stress was measured at either the break point or 500% elongation.

As shown in Table 4, Samples E and F which contained polyester showed weak hydrolysis resistance and after 3 days in the 1% NaOH solution the stress strength and strain values were reduced significantly. The films were too weak to measure after five days. Sample G, which contained non-polymeric diol instead of polyester, showed excellent hydrolysis resistance and the film properties were still very strong even after 10 days in the caustic solution.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A moisture curable polyurethane hot melt adhesive composition having improved hydrolysis resistance including a reaction product prepared from a mixture consisting of an isocyanate, optionally a polyether polyol, an amount of one or more non-polymeric diols effective to provide improved hydrolysis resistance selected from the group consisting of aromatic diols, aliphatic diols and mixtures thereof, and a functional and/or non-functional thermoplastic polymer or mixture thereof, wherein the non-polymeric diol comprises a crystalline diol and wherein the composition has an improved hydrolysis resistance over a period of at least three days as shown by the modulus, stress and strain of the composition.

2. The adhesive of claim 1, wherein the non-polymeric diol comprises a liquid crystalline diol.

3. The adhesive of claim 1, wherein the crystalline diol is selected from the group consisting of 1,5-Dihydroxynaphthalene, 2',4'-Dihydroxybenzophenone; and 4,4'-(Hexanfluroisopropylidene)diphenol, 4-hydroxyphenethyl alcohol; 2-hydroxy-4-methoxybenzyl alcohol; hydroxybenzyl alcohol, 2-(2-Hydroxyethoxy)phenol, 4-hydroxy-3-methoxybenzyl alcohol, 4-hydroxyphenethyl alcohol, hydroquinone di(beta-hydroxyethyl)ether, 2,6-Dihydroxyanthraquinone; 1,5-Dihydroxynaphthalene (DHN); Diethylstilbestrol; 9H-Fluorene-9,9-dimethanol; Eosin B, 5-tert-Butyl-4-hydroxy-2-methylphenyl sulfide; 3-(4-Carboxylphenyl)2,3-dihydro-1,1,3-trimethyl indene-5-carboxylic acid; 2',4'-Dihydroxyacetophenone, tetramethyl benzene dimethanol, dodecane diol, cyclohexane diol, decane diol, octane diol, cyclododecane diol, hexane diol and mixtures thereof.

4. The adhesive of claim 1, wherein the adhesive comprises from about 0.1 wt % to about 40 wt % of the non-polymeric diol.

5. The adhesive of claim 1 which comprises a non-functional acrylic polymer.

6. The adhesive of claim 1 which comprises a functional acrylic polymer.

7. The adhesive of claim 6 wherein the functional acrylic polymer is a hydroxy functional acrylic polymer.

8. The adhesive of claim 1, wherein the one or more non-polymeric diol has a molecular weight of 2,000 or less.

9. An article of manufacture comprising the adhesive of claim 1.

10. The adhesive of claim 1 wherein the reaction product is prepared from a mixture consisting of an isocyanate, the amount of one or more non-polymeric diols effective to provide improved hydrolysis resistance selected from the group consisting of aromatic diols, aliphatic diols and mixtures thereof, and the functional and/or non-functional thermoplastic polymer or mixture thereof.

* * * * *

UNITED STATES PATENT AND TRADEMARK OFFICE
CERTIFICATE OF CORRECTION

PATENT NO. : 8,664,330 B2
APPLICATION NO. : 10/408141
DATED : March 4, 2014
INVENTOR(S) : Ju-Ming Hung et al.

Page 1 of 1

It is certified that error appears in the above-identified patent and that said Letters Patent is hereby corrected as shown below:

IN THE CLAIMS:

Column 10, line 25: After "Eosin B," Insert -- 5–tertbutyl–1,3–benzenedicarboxilic acid; --.

Signed and Sealed this
Third Day of May, 2016

Michelle K. Lee
*Director of the United States Patent and Trademark Office*